Patented Oct. 5, 1937

2,094,771

UNITED STATES PATENT OFFICE 2,094,771

COMPOSITION OF MATTER

William Hale Charch, Buffalo, and Albert Hershberger, Kenmore, N. Y., assignors, by mesne assignments, to E. I. du Pont de Nemours & Company, Wilmington, Del., a corporation of Delaware No Drawing. Application February 24, 1934, Serial No. 712,793

1 Claim. (Cl. 134—79)

This invention relates to moistureproof materials and more particularly to a composition which will deposit a glass-clear, flexible and moistureproof coating.

Prior to this invention, in order to produce glass-clear and moistureproof regenerated cellulose sheeting, the base regenerated cellulose sheeting was coated with compositions containing a minor portion of a wax or waxy substance. When a lacquer containing nitrocellulose was employed for the moistureproofing, the wax was present in an amount less than 10% of the total solids. According to the prior art, if the wax in nitrocellulose lacquers were present in amounts greater than 10% of the total solids, the coating would have an undesirable wax blush or haze which impaired the glass-clear transparency of the coated film.

Contrary to the teachings of the prior art, we have found that we can prepare glass-clear, transparent, moistureproof coatings from nitrocellulose lacquers, the solids of which contain wax in excess of the cellulose nitrate and/or 50% or more of wax.

It is, therefore, an object of this invention to provide a nitrocellulose lacquer, the solids of which contain wax in excess of the cellulose nitrate and/or 50% or more of wax, which will deposit glass-clear, moistureproof, flexible films or coatings upon the evaporation of the solvent at a temperature at least equal to the melting point of the wax in the composition.

Another object of this invention is to provide a moistureproof material, preferably glass-clear and suitable for use as a wrapping tissue, and comprising a transparent base thinly coated with a lacquer composition, the solids of which contain wax in excess of cellulose nitrate and/or 50% or more of wax.

Other objects will appear from the following description and appended claim.

As is apparent from the foregoing objects, the instant invention in one of its specific phases relates to a composition, hereafter more fully explained, the solids of which contain wax and cellulose nitrate, the wax being in excess of the quantity of the nitrocellulose present and/or 50% or more of said solids and which will deposit a moistureproof, glass-clear coating or film upon the evaporation of the solvent at an elevated temperature.

In general, the compositions to which the instant invention relate may be classified into four classes, the constituents of which consist of the following:

(1) Wax, cellulose derivative and solvent;
(2) Wax, cellulose derivative, plasticizer and solvent;
(3) Wax, cellulose derivative, plasticizer, resin or blending agent, and solvent;
(4) Wax, cellulose derivative, resin or blending agent, and solvent.

As the wax, a paraffin wax having a melting point between 50° C. and 60° C., and preferably over 60° C., is preferred. Other waxes, such as beeswax, candelilla wax, bayberry, spermaceti and Montan wax may also be used. In some instances two or more waxes may be used in the combination. For instance, when candelilla wax is used conjointly with paraffin wax, there results a surface which is less susceptible to finger marks. In other words, candelilla wax serves to impart a hardness to the ultimate coating. Spermaceti wax acts as a blending agent for paraffin with pyroxylin. Certain synthetic waxes or wax-like materials or esters obtained chemically from higher alcohols and acids, such as montanic acid ester of lauryl alcohol, may be used.

As the cellulose derivative, a pyroxylin having a high viscosity, such as 200 to 400 seconds and specifically of the order of 300 seconds, is preferred. However, a pyroxylin of different viscosity, such as from one-half second up to one thousand seconds or more, may be used. It is advantageous to use a soluble pyroxylin of moderately high viscosity to give the coating composition sufficient body for satisfactory coating. In so far as the nitrogen content of the nitrocellulose is concerned it may be that which is ordinarily used in lacquer grade nitrocelluloses. Though pyroxylin of the type above mentioned is preferred, it is also possible to use other cellulose derivatives such as higher cellulose esters, cellulose ethers or mixed esters.

In those compositions including a plasticizer, it is possible to use 2-methyl-hexa-hydro-benzyl-phthalate or most of the common pyroxylin plasticizers, such as dibutyl phthalate, tricresyl phosphate, etc. Certain plasticizers may function both as plasticizer and blending agent for the wax and the cellulose derivative. Dixylylethane is illustrative of such a material which so functions when the cellulose derivative is ethyl cellulose.

When the composition is of the type which includes them, any resin or blending agent compatible with the cellulose derivative and the wax may be used. Those resins which act as blending agents for the wax and the cellulose derivative and which impart a hard, non-greasy surface to the coating are especially desirable. As several illustrative examples of the especially suited resins may be mentioned rosin and its esters, hydrogenated rosin, esters of hydrogenated rosin and also synthetic resins, such as are sold under the trade names "Albertols" and "Amberols".

The solvent employed in the composition is very important, since it determines whether the coating or film will be clear or hazy. As the solvent, a solvent for pyroxylin, which is also at once an active solvent for the wax, is preferred. Preferably, the solvent is one which boils at 80° C. or 100° C. or higher. This solvent is further generally characterized by being completely miscible in all proportions with the waxy constituent of the solids at a temperature higher than the melting point of the wax in the composition. In addition, such solvent should possess the property of dissolving considerable amounts of wax even at temperatures appreciably lower than the melting point of the wax, such as 10° C. or 20° C. lower, or, in certain cases, still lower. A convenient criterion for classifying the pyroxylin solvent employed is as follows:

A 2% solution of paraffin wax melting at approximately 60° C. to 62° C. is prepared in the solvent at a temperature above the melting point of the wax. This solution is then allowed to cool gradually and the temperature at which the wax begins to crystallize is noted. If the temperature at which the wax begins to crystallize lies above 50° C. and solvent, in general will not be suitable for the herein described purpose. On the other hand, if the temperature of crystallization lies under 50° C. the solvent in general will be found to be suitable. By the same test it has also been found that the lower the temperature of crystallization of the wax from such a solution, the more effective will be the solvent for the herein described purpose. For instance, certain very effective solvents when submitted to the above test retain the wax in solution at temperatures as low as 40° C. or even lower.

Several illustrative solvents which have given satisfactory results are the higher boiling solvents, such as amyl acetate or higher acetates, butyl butyrate, acetone oil, monobutyl ether of ethylene glycol, methyl butyl ketone, beta ethoxy ethyl acetate and cyclohexanone.

As above explained, the aforementioned solvents may be used alone, that is, without the addition of any other solvent material or diluent. However, they may be used with other suitable solvents of similar nature or they may be used with hydrocarbon diluents, such as toluol, benzol, etc., provided such diluents are not present in such large quantities as would cause the precipitation of the nitrocellulose during the evaporation of the solvent. In general, the use in any solvent mixture of appreciable quantities of solvents which are not active paraffin solvents, such as alcohol, acetone, etc., is to be avoided. Small quantities of these materials, however, may be present without deleterious effect. For example, alcohol should not be present in an amount of more than 15%. Generally, if alcohol is used, it should be present in an amount less than 10% and preferably 1% or less. A preferred solvent mixture consists of pyroxylin solvent of the type described, with or without small quantities of alcohol, and a hydrocarbon diluent, preferably an aromatic hydrocarbon diluent or chlorinated aliphatic hydrocarbon solvent, and the said diluent being present in quantities insufficient to cause the precipitation of the nitrocellulose during evaporation of the solvent.

In all cases the ingredients of the solvent are of such a nature as to maintain all the solid ingredients in solution until substantially all the solvents have been evaporated.

The solids content of the coating composition may vary between 2% and 20% by weight. However, 5% to 10% solids content gives very good results.

The composition hereinbefore described is applied to a base of the type more fully explained hereafter in any suitable and convenient manner, such as dipping, spraying, etc. The excess composition is removed in any suitable manner, such as by means of scraper rods, doctor knives or doctor rolls, and preferably, either heated doctor rods or heated doctor knives. The coated sheets are then transferred to a drier, the temperature of which is held at approximately 80° C.–120° C. After drying, the coated material may be given a humidifying treatment, whereby the residual solvents are removed, and also a suitable amount of moisture is introduced into the base sheet.

The compositions are to be applied to the base in a relatively thin coating. The total coating thickness on both sides of the base film may range from approximately 0.00001 to 0.00010 of an inch, although, in certain special instances, it may be possible to use coatings of somewhat greater thickness. When the solids of the composition consist of a mixture of wax and nitrocellulose, the coating thickness should generally be less than the coating thickness used when the composition also contains a blending agent and should generally approach the lower limits of the thickness range above set forth.

The compositions herein described are particularly suitable for application to a transparent sheeting base, such as regenerated cellulose, glycol cellulose, casein, gelatin, cellulose acetate, etc. They may also be used on papers, such as glassine or other smooth, semi-transparent papers. It is to be understood that the solvents of the applied composition will be selected so as not to deleteriously affect the base to which it is applied.

When the process is carried out as hereinbefore described, the product is moistureproof, flexible, non-tacky, odorless and, when the base is transparent, the final product is also transparent.

For the purposes of this specification and claim, we define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value." An uncoated sheet of regenerated cellulose having a thickness of approximately 0.0009" will show a permeability value of the order of 6900.

From the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

In order to more clearly explain the nature of the invention, the following specific examples are set forth:

*Example I—Wax-pyroxylin composition*

(a)
| | Parts by weight |
|---|---|
| Paraffin wax (M. P. 60° C.–62° C.) | 7.5 |
| Pyroxylin (283 seconds) | 2.5 |
| Ethyl alcohol | 1.1 |
| Acetic acid esters of high molecular weight synthetic alcohols (B. P. 140° C.–180° C.) | 189.0 |

A sheet of regenerated cellulose, or other transparent material, is dipped into this solution and the excess coating composition removed by any suitable means, such as by means of scraper rods, doctor knives, or doctor rolls. The coated sheets are transferred to a drier, the temperature of which is held at approximately 100° C. to 120° C. After the sheet is thoroughly dry, which may require anywhere from 30 seconds to 3 minutes, it may either be removed or it may be subjected to a humidifying step. The humidifying step removes traces of residual solvents and also incorporates a suitable amount of moisture into the base sheet.

The total coating on both sides of the sheet should preferably not exceed 0.00004–0.00005 of an inch. The coated sheet is glass-clear, flexible, non-tacky and moistureproof.

(b) The above solids may be used with the following solvent composition:

| | Parts by weight |
|---|---|
| Amyl acetate | 123.5 |
| Alcohol | 19.0 |
| Low flash naphtha | 47.5 |

The method of applying the coating and drying is the same as in I(a). The properties of the coated sheet are also the same as given in I(a).

(c)
| | Parts by weight |
|---|---|
| Paraffin wax (M. P. 60° C.–62° C.) | 7.5 |
| Spermaceti wax | 2.0 |
| Pyroxylin (283 seconds) | 2.5 |
| Acetic acid esters of high molecular weight synthetic alcohols (B. P. 140° C.–180° C.) | 125.0 |
| Alcohol | 20.0 |
| Low flash naphtha | 50.0 |

The process for applying the coating composition and the properties of the finished sheets are the same as those described under I(a).

(Note: Spermaceti is used here as a blending agent.)

(d)
| | Parts by weight |
|---|---|
| Paraffin wax (M. P. 60° C.–62° C.) | 9.0 |
| Pyroxylin (283 seconds) | 1.0 |
| Amyl acetate | 123.5 |
| Alcohol | 20.0 |
| Low flash naphtha | 47.5 |

The method of application and drying of the coating composition is the same as that described under I(a). The coating thickness is about 0.00001 of an inch. The coated sheet is flexible, non-tacky, and glass-clear. The coating has the same surface properties as Example I(a).

(e)
| | Parts by weight |
|---|---|
| Paraffin wax (M. P. 48° C.–50° C.) | 8.0 |
| Pyroxylin (283 seconds) | 2.0 |
| Amyl acetate | 123.5 |
| Alcohol | 20.0 |
| Toluol | 47.5 |

The process for application and the properties of the sheet are the same as those described in Example I(a).

(f) White beeswax is substituted for the paraffin wax of Example I(e).

The method of application and the properties of the finished sheet are approximately the same as those described under Example I(a).

(g) Candelilla wax is substituted for the paraffin wax of Formula I(e).

This sheet is glossy, clear and non-smearing.

(h) Montan wax is substituted for the paraffin wax of Formula I(e).

The sheet is glossy, clear and non-smearing.

(i)
| | Parts by weight |
|---|---|
| Paraffin wax (M. P. 60° C.–62° C.) | 7.5 |
| Pyroxylin (283 seconds) | 2.5 |
| Spermaceti wax | 2.0 |
| Ethoxy ethyl acetate | 117.0 |
| Toluol | 78.0 |
| Alcohol | 2.0 |

The spermaceti wax in this formula acts in the capacity of a blending agent. The coating thickness is about 0.00001 of an inch. The resulting sheet is flexible, non-tacky and glass-clear.

*Example II—Wax-pyroxylin-resin*

(a)
| | Parts by weight |
|---|---|
| Paraffin wax (M. P. 60° C.–62° C.) | 7.5 |
| Pyroxylin | 2.5 |
| Hydrogenated rosin | 1.0 |
| Amyl acetate | 123.5 |
| Alcohol | 20.0 |
| Toluol | 47.5 |

The method of applying the coating composition and drying the coated sheet are the same as described under I(a). The coated and dried sheet is flexible, non-tacky and glass-clear. The coating thickness (both sides) may be about 0.00005–0.00006 of an inch.

(b) "Amberol", grade BS–1, is substituted for the hydrogenated rosin in Example II(a). The resulting coated sheet is transparent, flexible and non-tacky.

(c)
| | Parts by weight |
|---|---|
| Paraffin wax (M. P. 60° C.–62° C.) | 6.0 |
| Pyroxylin | 4.0 |
| WW Rosin | 3.0 |
| Methyl butyl ketone | 195.0 |
| Alcohol | 1.7 |

The coating composition is applied and dried as previously described. The coating thickness is approximately about 0.00001 of an inch. The coated sheet is non-tacky, flexible, glass-clear and does not smear when handled.

(d)
| | Parts by weight |
|---|---|
| Paraffin wax (M. P. 60° C.–62° C.) | 5.0 |
| Pyroxylin | 5.0 |
| WW rosin | 4.0 |
| Amyl acetate | 123.5 |
| Alcohol | 20.0 |
| Toluol | 47.5 |

The coating composition is applied and dried as previously described. The properties are the same as II(c).

(e)
| | Parts by weight |
|---|---|
| Paraffin wax (M. P. 60° C.-62° C.) | 7.5 |
| Pyroxylin (283 seconds) | 2.5 |
| Hydrogenated rosin | 1.0 |
| Candelilla wax | 1.0 |
| Amyl acetate | 123.5 |
| Alcohol | 20.0 |
| Low flash naphtha | 47.5 |

The coating composition is applied and dried as previously described. The coating thickness may be from 0.00005 to 0.00006 of an inch. The properties are the same as II(a).

Example III—Wax-pyroxylin-plasticizer (a)
| | Parts by weight |
|---|---|
| Paraffin wax (M. P. 60° C.-62° C.) | 7.5 |
| Pyroxylin (283 seconds) | 2.5 |
| Dixylyl ethane | 2.0 |
| Butyl acetate | 117.0 |
| Toluol | 78.0 |
| Alcohol | 2.0 |

The coating composition is applied and dried as previously described. The coating thickness is of the order of 0.00001 to 0.00004 of an inch. The properties are the same as II(a).

(b)
| | Parts by weight |
|---|---|
| Paraffin wax (M. P. 60° C.-62° C.) | 7.5 |
| Pyroxylin (283 seconds) | 2.5 |
| 2 - Methyl - hexa - hydro - benzyl - phthalate | 2.0 |
| Acetic acid esters of high molecular weight synthetic alcohols (B. P. 140° C.-180° C.) | 123.5 |
| Alcohol | 20.0 |
| Low flash naphtha | 47.5 |

The coating and drying is the same as previously described. The ultimate sheet is flexible, non-tacky and transparent.

Example IV—Wax-pyroxylin-resin-plasticizer (a)
| | Parts by weight |
|---|---|
| Paraffin wax (M. P. 60° C.-62° C.) | 6.0 |
| Pyroxylin | 4.0 |
| WW rosin | 3.0 |
| Tricresyl phosphate | 2.0 |
| Methyl butyl ketone | 200.0 |
| Alcohol | 2.0 |

The coating is applied and dried as previously described. The product is flexible, non-tacky and glass-clear, and the surface is substantially non-smearing.

(b) 2 grams of candelilla wax are added to Formula IV(a) with the result that a slightly harder coat is obtained which is more resistant to abrasion.

Since it is obvious that various changes and modifications may be made in the above description without departing from the nature or spirit thereof, this invention is not restricted thereto except as set forth in the appended claim.

We claim:

A liquid coating composition consisting essentially of the following ingredients and approximate proportions by weight:

| | Parts by weight |
|---|---|
| Paraffin (M. P. 60° C.-62° C.) | 7.5 |
| Pyroxylin | 2.5 |
| Hydrogenated rosin | 1.0 |
| Amyl acetate | 123.5 |
| Alcohol | 20.0 |
| Toluol | 47.5 | said composition depositing a glass-clear, flexible, moistureproof coating upon the evaporation of the solvent at a temperature at least equal to the melting point of the wax in the composition.

WILLIAM HALE CHARCH.
ALBERT HERSHBERGER.